United States Patent [19]

Asaida

[11] Patent Number: 4,672,430
[45] Date of Patent: Jun. 9, 1987

[54] COLOR TELEVISION CAMERA USING THE GREEN SIGNAL FOR VERTICAL ENHANCEMENT AND THE GREEN AND ANOTHER SIGNAL FOR HORIZONTAL ENHANCEMENT

[75] Inventor: Takashi Asaida, Kanagawa, Japan

[73] Assignee: Sony Corporation, Tokyo, Japan

[21] Appl. No.: 826,027

[22] Filed: Feb. 4, 1986

[30] Foreign Application Priority Data

Feb. 8, 1985 [JP] Japan .................................. 60-23293

[51] Int. Cl.⁴ ............................................. H04N 9/64
[52] U.S. Cl. ........................................ 358/37; 358/50
[58] Field of Search .................................. 358/50, 37

[56] References Cited

U.S. PATENT DOCUMENTS 3,681,520 8/1972 Schneider ............................ 358/37

FOREIGN PATENT DOCUMENTS 127375 8/1982 Japan .................................... 358/37
46781 3/1983 Japan .................................... 358/37
8403242 5/1985 Netherlands ........................ 358/37

Primary Examiner—John W. Shepperd
Attorney, Agent, or Firm—Hill, Van Santen, Steadman & Simpson

[57] ABSTRACT

An image enhancer for a color television camera using plural CCD image sensors is proposed, wherein an image of an object on the image sensors for generating the green signal is displaced in the horizontal direction by half the alignment pitch of picture elements relative to the image of the object projected on the image sensors for generating red and blue signals. A vertical image enhancing signal is generated from the green signal only, and a horizontal image enhancing signal is generated from the equally added sum of the green signal and a signal formed of at least the red signal. A composite image enhancing signal is formed by adding the vertical and horizontal image enhancing signals, and is added to the primary color signals.

6 Claims, 5 Drawing Figures

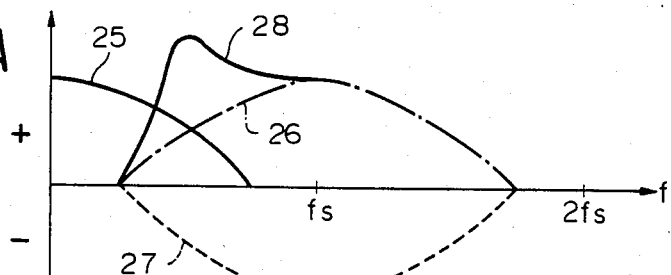
Fig. 3A
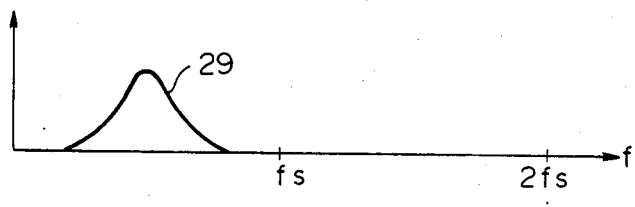
Fig. 3B
Fig. 4
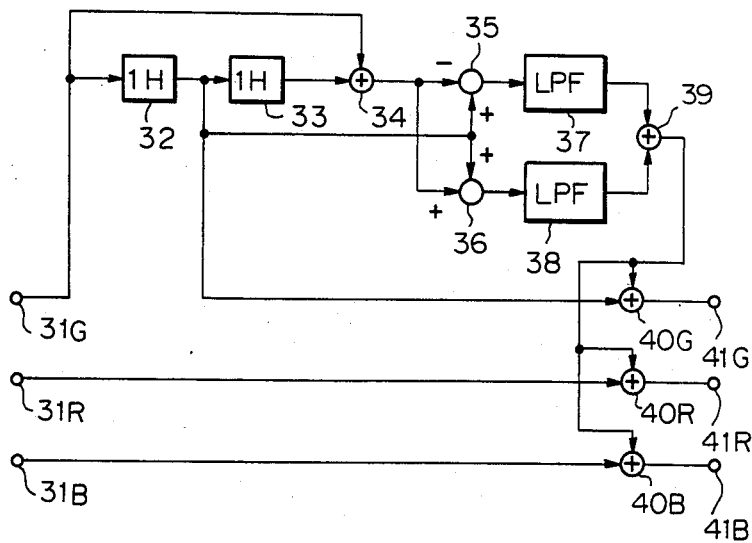

COLOR TELEVISION CAMERA USING THE GREEN SIGNAL FOR VERTICAL ENHANCEMENT AND THE GREEN AND ANOTHER SIGNAL FOR HORIZONTAL ENHANCEMENT

BACKGROUND OF THE INVENTION

1. Field of the Invention

This invention relates generally to an image enhancer, and more particularly is directed to an image enhancer for a color television camera having plural solid state image sensors.

2. Description of the Prior Art

In the existing color television camera having three pick-up tubes, three primary color signals, such as green, red and blue color signals, are supplied to a matrix circuit and a luminance signal is generated therefrom, and an image enhancing signal generated from the luminance signal is added to the luminance signal. However, the image enhancing signal generated from the luminance signal is not always a correct signal representing the edge component of the image due to the misregistrations of the three pick-up tubes. And so an image enhancer in which an image enhancing signal is generated from a green primary color signal only has been proposed. Such an image enhancer is shown in FIG. 4.

In FIG. 4, numerals 31G, 31R and 31B show input terminals to which primary color signals from pick-up tubes for green, red and blue are supplied, respectively. The green signal G at the input terminal 31G is phase advanced by one horizontal scanning period as to red and blue signals which are obtained at the input terminals 31R and 31B. The green signal G is supplied to a series circuit of delay line circuits 32 and 33 of one horizontal scanning period. The input signal of the delay line circuit 32 and the output signal of the delay line circuit 33 are added together by an adder 34. The output signal of the delay line circuit 32 is supplied to one input of a subtracter 35 while the output of the adder 34 is also supplied to another input of the subtracter 35, and the vertical edge or contour component signal is generated at the output of the subtracter 35. The output signal of the subtracter 35 is supplied to a low-pass-filter 37 and the bandwidth of the signal in the horizontal direction is limited thereby. And the vertical image enhancing signal is generated at the output of the low-pass-filter 37.

The output signals of the adder 34 and the delay line circuit 32 are supplied to the adder 36. And the output signal of the adder 36 is supplied to a high-pass-filter 38 which forms twice differentiating circuit, and the horizontal image enhancing signal is obtained at the output of the high-pass-filter 38. The output signals of the low-pass-filter 37 and the high-pass-filter 38 are added together by an adder 39, and a composite image enhancing signal is generated at the output of the adder 39. The composite image enhancing signal from the adder 39 is supplied to adders 40G, 40R and 40B respectively and added to the input primary color signals. Accordingly, the image enhanced green, red and blue signals are obtained at output terminals 41G, 41R and 41B which are led out from the outputs of the adders 40G, 40R and 40B respectively.

The above image enhancer, if applied to a color television camera having three pick-up tubes, can realize a pretty good fidelity as the green signal generated from the pick-up tube has the sufficient resolution and the contribution ratio of the green signal to the luminance signal is very high.

However, if the above described image enhancer is applied to a color television camera having three solid state image sensors, such as CCD image sensors, for green, red and blue colors of an image of an object wherein the image of the object projected on the image sensor for green is displaced in the horizontal direction by half the alignment pitch of picture elements relative to the image of the object projected on the other image sensors for cancelling the sampling side band component centered by the sampling frequency when the image of the object is B/W or colored with low color saturation and for improving the resolution of the picture, the balance of the level of the sampling side band components is broken due to the image enhancing signal generated from the green signal, and so the object for improving the resolution can not be achieved.

SUMMARY OF THE INVENTION

Accordingly, an object of the present invention is to provide an improved image enhancer for a color television camera using solid state image sensors.

Another object of the present invention is to provide an improved image enhancer for a color television camera using solid state image sensors, which is free from aliasing noise.

Further object of the present invention is to provide an improved image enhancer for a color television camera using solid state image sensors, in which the sampling side band components centered by the sampling frequency of the image enhanced signals are balanced when the image of the object is B/W or colored with low color saturation.

According to an aspect of the invention, in an image enhancer for a color television camera using solid state image sensors, a vertical image enhancing signal is generated from a green signal only, an image of an object projected on the image sensor for green being displaced by half the alignment pitch of picture elements as to that projected on the other image sensors, and a horizontal image enhancing signal is generated from the equally added sum of the green signal and at least the red signal.

Other objects, features and advantages of this invention will be apparent from the following description taken in conjunction with the accompanying drawings.

BRIEF DESCRIPTION OF THE DRAWINGS

FIGS. 3A and 3B show the frequency spectrum used for explaining the operation of the present invention; and FIG. 4 is a circuit diagram showing an example of prior art image enhancer.

DESCRIPTION OF THE PREFERRED EMBODIMENTS

This invention will be hereinafter described in detail with reference to the drawings.

Figure 1:
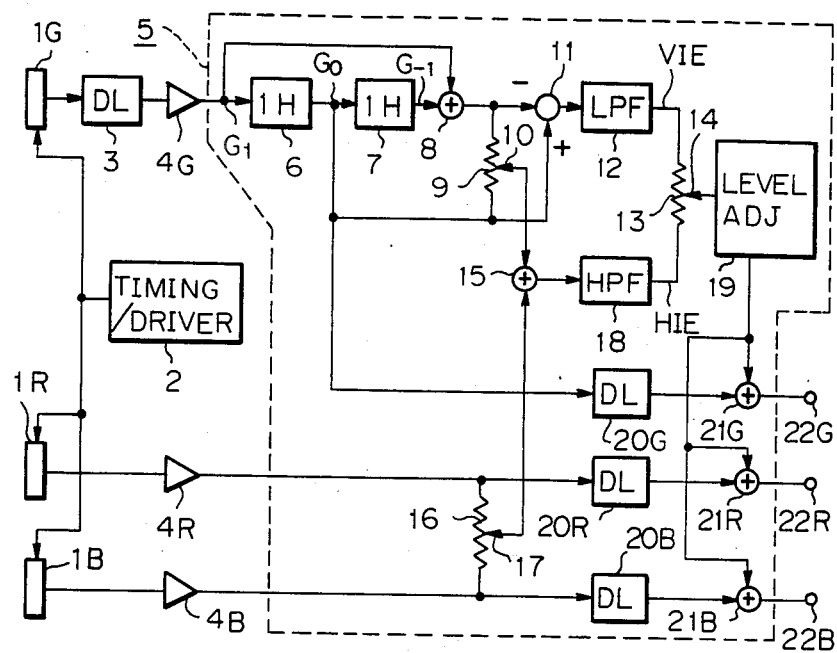
FIG. 1 is a circuit diagram showing an enbodiment of the present invention.
Figure 2:
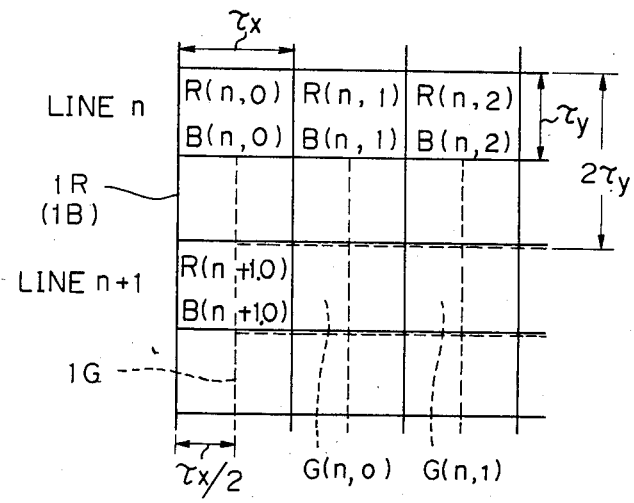
FIG. 2 is a view showing the relationship between solid state image sensors used for a present invention.

In FIG. 1, reference numerals 1G, 1R and 1B show CCD image sensors respectively, 2 shows a timing generator and a driver for generating common clock signal and a timing signal for driving CCD image sensors 1G, 1R and 1B. Picture elements of these image sensors 1G, 1R and 1B are arranged as shown in FIG. 2.

An alignment pitch of each of the image sensors 1G, 1R and 1B in the horizontal direction is $\tau_x$ and that in the vertical direction is $2\tau_y$. In FIG. 2, assuming that the successive two lines in the same field are numbered n and (n+1), the picture elements of the image sensors 1R and 1B are shown with this line number and the element number in the line. As is clear from FIG. 2, the corresponding picture elements of the image sensors 1R and 1B are located in the same spacial position with each other. On the contrary, as shown by the broken line in FIG. 2, the picture elements of the image sensor 1G are spacially displaced by $\frac{1}{2}\tau_x$ in the horizontal direction and $2\tau_y$ in the vertical direction relative to the corresponding picture elements of image sensors 1R and 1B.

Because of the vertical displacement of the CCD image sensor 1G, the output signal of the image sensor 1G is phase advanced by one horizontal scanning period as to the output signals of the CCD image sensors 1R and 1B.

The green signal G from the CCD image sensor 1G is supplied to an image enhancing circuit 5 enclosed by a broken line through a delay circuit 3 and an amplifier 4G. The delay circuit 3 has the delay time for compensating the phase gain due to the horizontal displacement $\frac{1}{2}\tau_x$ of the CCD image sensor 1G. The output signals, the red signal R and the blue signal B, of the image sensors 1R and 1B are supplied to the image enhancing circuit 5 enclosed by the broken line through amplifiers 4R and 4B respectively.

The green signal $G_1$ from the amplifier 4G is supplied to a series circuit of delay line circuits 6 and 7 of one horizontal scanning period and also to one input-terminal of an adder 8. To another input terminal of the adder 8, the output signal of the delay line circuit 7 is supplied. Now, if it is assumed that the input signal to the delay line circuit 6 be $G_1$, the output signal of the delay line circuit 6 be $G_0$, and the output signal of the delay line circuit 7 be $G_{-1}$, the output signal of the adder 8 is $\frac{1}{2}(G_1+G_{-1})$. The output signal of this adder 8 and the output signal of the delay line circuit 6 are supplied to a subtracter 11, and so the output signal of the subtracter 11 is $[2G_0-(G_1+G_{-1})]/4$. The vertical edge or contour component of the image based on only the green signal is obtained from the subtracter 11.

The output signal of the subtracter 11 is supplied to a low-pass-filter 12 for limiting the bandwidth of the signal in the horizontal direction. By this low-pass-filter 12, the vertical edge or contour component of the image is prevented from being mixed to the subcarrier frequency band (horizontal frequency $f_{sc}$) and the cross color can be prevented from being occurred. And the vertical image enhancing signal VIE is generated at the output of the low-pass-filter 12.

The horizontal image enhancing signal HIE is formed from the equally added sum of the green signal G and the added signal of the red and blue signals (R+B). This is for cancelling the aliasing noise in the image enhanced signals at the output terminals of the image enhancer, that is, because of the horizontal image enhancing signal HIE formed as described above, the sampling side band components centered by the sampling frequency which is corresponding to the alignment pitch of the picture elements, of the image enhanced signals are balanced with each other.

That is, because of the horizontal displacement $\frac{1}{2}\tau_x$ of the CCD image sensor 1G, the sampling side band component centered by the sampling carrier frequency (shown as one dot chain line 26 of FIG. 3A) of the output green signal G of the CCD image sensor 1G and the sampling side band component centered by the sampling carrier frequency (shown as broken line 27 of FIG. 3A) of the output red and blue signals R and B of the image sensors 1R and 1B respectively are opposite phases with each other. As the phases of these sampling side band components are opposite with each other, if the levels of these components are equal, these components are canceled out by adding the green red and blue signals together with the proper ratio, and these side band components are prevented from being mixed to the baseband component 25 (shown as solid line of FIG. 3A).

If the frequency characteristics.bf the image enhancing in the horizontal direction is shown by the solid line 29 of FIG. 3B, the image enhancing signal as shown by solid line 28 in FIG. 3A is formed from the green signal. According to the present invention, as will be described in detail hereinafter, the horizontal image enhancing signal is formed from the equally added sum of the green signal G and the red and blue signal (R+B) not from the green signal only. Therefore the sampling carrier of the horizontal image enhancing signal is balanced, and so the resolution of the picture can be prevented from lowering due to the sampling side band component of the image enhancing signal.

Fixed terminals of a varriable resistor 9 are connected to the outputs of the adder 8 and the delay line circuit 6. And if it is assumed that the coefficient according to the position of a variable tap 10 is $\alpha$, the output signal at the variable tap 10 is as follows, $$\alpha G_0 + \tfrac{1}{2}(1-\alpha)(G_{-1}+G_1)$$

The output signal of the variable tap 10 is supplied to an adder 15.

While, the output signal of the delay line circuit 6 is supplied to an adder 21G through a delay circuit 20G, the red signal R from the CCD image sensor 1R is supplied to an adder 21R through an amplifier 4R and a delay circuit 20R, and the blue signal B from the CCD image sensor 1B is supplied to an adder 21B through an amplifier 4B and a delay circuit 20B. These delay circuits 20G, 20R and 20B have the delay time for compensating the time delay caused by the low-pass-filter 12 and the high pass filter 18. A variable resistor 16 is connected between the outputs of the amplifiers 4R and 4B, and an output signal of a variable tap 17 of this variable resistor 16 is supplied to the adder 15.

If it is assumed that the coefficient according to the position of the variable tap 17 of the variable resistor 16 is $\beta$, the output signal of the variable tap 17 which is supplied to the adder 15 is as follows, $$\beta R_0 + (1-\beta)B_0$$

The coefficient $\beta$ is very closed to 1 and the signal to be supplied to the adder 15 is mainly formed by the red signal. In the output signal of the adder 15, the sampling side band component centered by the sampling frequency is perfectly cancelled out.

The outputsignal of this adder 15 is supplied to the high-pass-filter 18. This signal is differentiated twice. in the high-pass-filter 18, and the horizontal image enhancing signal HIE is generated at the output of the high-pass-filter. A variable resistor 13 are connected between the outputs of the low-pass-filter 12 and the high-pass-filter 18, and a variable tap 14 of the variable resistor 13 is connected to a level adjusting circuit 19.

In addition to the level adjusting circuit 19, a coring circuit may be arranged if necessary. The output signal of the level adjusting circuit 19, which is a composite image enhancing signal, is supplied to the adders 21G, 21R and 21B respectively. And the composite image enhancing signal is added to the green signal G, the red signal R and the blue signal B from the delay circuit 20G, 20R and 20B by these adder 21G, 21R and 21B respectively. The image enhanced picked up signals are obtained at output terminals 22G, 22R and 22B which are led out from the outputs of the adders 21G, 21R and 21B respectively.

The coefficient $\alpha$ determined by the variable resistor 9 defines the vertical characteristics of the horizontal image enhancing signal HIE. That is, the delay line circuits 6 and 7, the adder 8 and the variable resistor 9 form a vertical low-pass-filter for the horizontal image enhancing signal.

Now, if it is assumed that the coefficient $\alpha$ is 0, each coefficient for the green signals $(G_1, G_0, G_{-1})$ is $(\frac{1}{4}, 0, \frac{1}{4})$. As the coefficient of the red and blue signal $(R+B)$ is $\frac{1}{2}$, so the coefficients of the signals of the successive three lines at the output of the adder 15 are $(\frac{1}{4}, \frac{1}{2}, \frac{1}{4})$. Therefore the response at the vertical frequency of the color subcarrier signal, $(\tau_y v)/2\pi = \frac{1}{2}$ becomes zero, and that means the characteristics of the vertical low-pass-filter is perfect when the image is B/W. Thus, the object of arranging the low-pass-filter in the vertical direction for the horizontal image enhancing signal is to prevent the crosstalk of the luminance signal to the color signal from being occurred.

If the coefficient $\alpha$ is $\frac{1}{3}$, the coefficients of the green signals are (1/6, 1/6, 1/6). And as the coefficient of the red and blue signal $(R+B)$ is $\frac{1}{2}$, the coefficients of the signals of the successive three lines at the output of the adder 15 are (1/6, 4/6, 1/6) and therefore the response at the vertical frequency of the color subcarrier frequency is $\frac{1}{2}$.

If the coefficient $\alpha$ is $\frac{1}{2}$, the coefficients of the green signals are $(\frac{1}{8}, \frac{1}{4}, \frac{1}{8})$. And as the coefficient of the red and blue signal $(R+B)$ is $\frac{1}{2}$, the coefficients of the signals of the successive three lines at the output of the adder are $(\frac{1}{8}, \frac{3}{4}, \frac{1}{8})$, and therefore the response at the vertical frequency of the color subcarrier frequency is $\frac{1}{2}$.

If the coefficient $\alpha$ is 1, the coefficients of the green signals are $(0, \frac{1}{2}, 0)$. As the coefficient of the red and blue signal $(R+B)$ is $\frac{1}{2}$, the coefficients of the signals of the successive three lines at the output of the adder 15 are (0, 1, 0), and so the vertical low-pass-filter is not formed and the crosstalk of the luminance signal to the color signal is not cancelled.

The coefficient $\beta$ determines the mixing ratio of the red signal R and the blue signal B, in the prefferred example of the present invention, from the view points of the contributions of the red and blue signals to the luminance signal and the signal to noise ratio of the blue signal, the coefficient $\beta$ is set to be closed to 1. Here, the value of the coefficient $\beta$ has no influence to the carrier balance of the output signal.

The above embodiment is the example wherein three CCD image sensors are used, but the present invention can be applied to the color television camera in which the two CCD image sensors, one for the green signal and one for the red and blue signals are used.

It will be apparent that many other modifications and variations could be effected by one skilled in the art without departing from the spirits or scope of the novel concepts of the present invention, so that the spirits or scope of the invention should be determined by the appended claims only.

I claim as my invention:

1. An image enhancer for a color television camera having plural solid state image sensors, an image of an object projected on one of said image sensors being displaced in the horizontal direction by half the alignment pitch of picture elements relative to the image of the object projected on the other of said image sensors, and one of said image sensors generating a first color signal and the other of said image sensors generating second and third color signals, said image enhancer comprising:

first enhancing signal generating means supplied with the first color signal and for generating a vertical image enhancing signal;

second enhancing signal generating means for generating a horizontal image enhancing signal and having an adder for adding said first color signal and a signal formed of at least said second color signal with the equal level ratio, first adding means for adding said vertical image enhancing signal and said horizontal image enhancing signal and for generating a composite image enhancing signal, and second adding means for adding said composite image enhancing signal to said first, second and third color signals, respectively.

2. An image enhancer according to claim 1, wherein said first color signal is green signal, said second color signal is red signal and said third signal is blue signal.

3. An image enhancer according to claim 2, wherein the picture elements of the image sensor for generating the green signal are spacially displaced by an alignment pitch in the vertical direction relative to the corresponding picture elements of the other of image sensors.

4. An image enhancer according to claim 3, wherein said first enhancing signal generating means includes a serially connected first and second delay line circuits of one horizontal scanning period supplied with the green signal at the input of said first delay line circuit, and adding circuit for adding the input signal of said first delay line circuit and the output signal of said second delay line circuit, a subtracter for subtracting the output signal of said adding circuit from the output signal of said first delay line circuit, and a low-pass-filter, whereby the vertical image enhancing signal is obtained at the output of said low-pass-filter.

5. An image enhancer according to claim 4, wherein said second enhancing signal generating means includes a variable resistor connected between the outputs of said adding circuit and said first delay line circuit and having a movable tap connected to said adder, and a high-pass-filter connected to the output of said adder whereby the horizontal image enhancing signal is obtained at the output of said high-pass-filter.

6. An image enhancer according to claim 2, wherein said signal formed of at least said red signal is generated by a variable resistor connected between signal lines of red and blue signals and having a movable tap connected to said adder.

* * * * *